May 12, 1931.  R. J. NORTON  1,805,183
BRAKE CLOSURE
Filed April 12, 1930
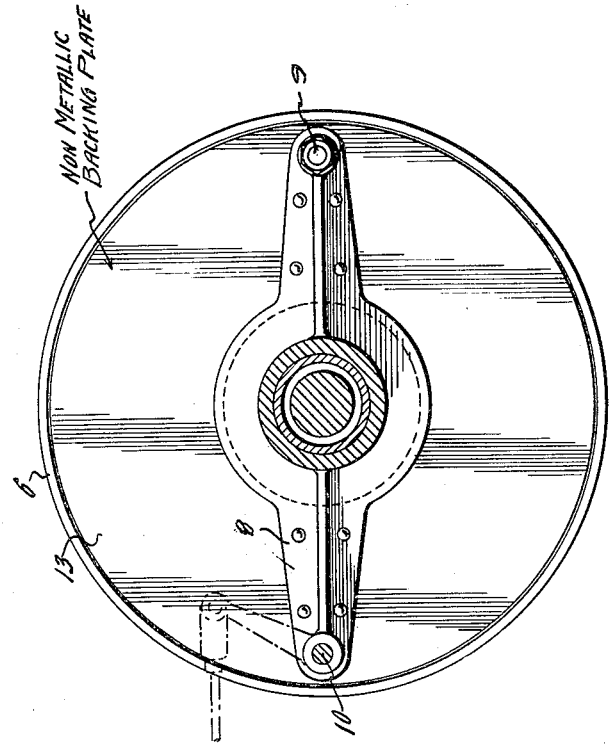
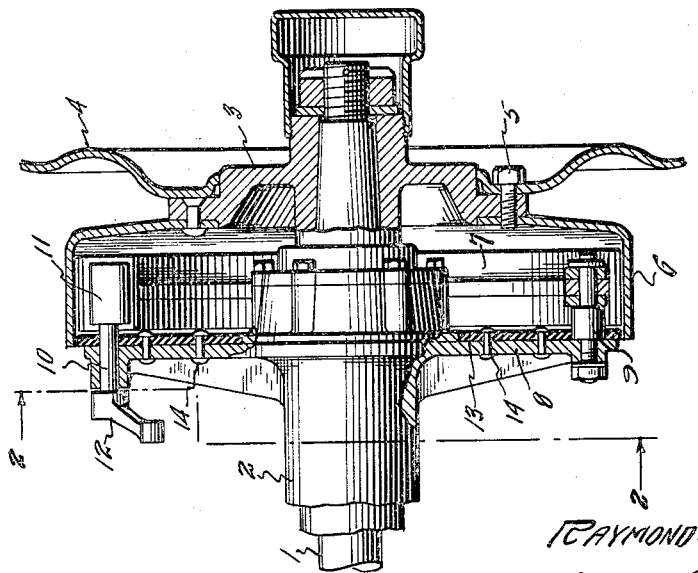

Patented May 12, 1931

1,805,183

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE CLOSURE

Application filed April 12, 1930. Serial No. 443,887.

This invention relates to brake structures. The ordinary type of brake apparatus employed on automotive vehicles and airplanes comprises a rotating drum, fixed to the wheel, and one or more nonrotatable braking members. When the nonrotatable members are of the internal expanding type, these are generally protected against mud, water, dirt, and extraneous matter, by means of a metallic backing plate. This backing plate may either be of relatively thin metal stamping or a metal member heavy enough to take the brake torque. Where the backing plate is a thin stamping, it is generally secured to a heavier metallic element, which latter element takes the heavy thrust incident to the braking operation.

In order to properly subserve their protective function, these backing plates must be so formed as to provide a relatively small clearance for the drum. This clearance is difficult to obtain with stamped parts, and particularly with cast metal parts. In addition to this disadvantage, such members also present the disadvantage of relatively easy corrodibility.

It is an object of this invention to provide a novel type of brake closure.

Another object is to provide a moulded brake drum closure.

A further object is to provide a nonmetallic backing plate for a drum.

Yet another object is to provide a noncorrodible backing plate for a brake drum.

Yet a further object is to provide a backing plate comprising a mouldable and machinable nonmetallic member.

A further object is to provide a metallo-resin backing plate.

With these and other objects in view, the invention comprehends the concept of providing a brake drum closure which is comprised of a mouldable plastic such as a synthetic resin. In order to render the invention more readily understood, a physical embodiment is shown in the accompanying drawings. In these, the same reference numerals apply to the several parts throughout the several views of which—

Figure 1 is a cross section of a typical brake structure and

Figure 2 is a view taken on the line 2—2 of Figure 1.

As indicated hereinbefore, the major object of the present invention is to provide a resinoid backing plate for a brake drum. This material presents the advantages of easy machinability, noncorrodibility, relative lightness as compared to metals, and relatively high tensile strength.

In the drawings there is shown a typical brake assemblage embodying a resinoid backing plate. In the drawings, a brake structure on the rear wheel of an automobile is shown, but this is to be taken as typical of any brake installation, whether it be on a dirigible wheel or on a landing gear of an airplane.

As shown in the drawings, the assemblage includes such conventional structure as the axle which is protected by the axle housing 2. At the outer end of the axle there is secured a hub 3. On this hub, the disk 4 (or equivalent rim-supporting means, such as spokes) is secured by any suitable means, such as the bolts 5. Secured to the hub or to the wheel disk or spokes, is a brake drum 6. Mounted within the drum, and adapted to be expanded into contact therewith, are the internal expanding shoes 7. All this is usual structure.

Either integrally or detachably secured to the axle housing, or other equivalent nonrotating part, is a spider 8. At its lower end, this is apertured to receive the anchor bolt 9. As is known, on this anchor bolt are pivoted the internal expanding shoes and through this bolt the brake stresses are transmitted to the spider. At another section of the spider, the operating shaft 10 is journalled. This is shown as being mounted within an elongated bushing and secured at one end to the cam 11 (or other expanding means) and at the opposite ends to the lever 12 (or other actuating means). While the cam shaft is shown as positioned diametrically opposite the anchor pin, it will be understood that it may be positioned at any desired circumferential point.

In accordance with the principles of the present invention, the drum is sealed or closed off by means of a resinoid product. This is shown as comprising the disk 13. This member may comprise a synthetic resin of the phenol methylene type, or other equivalent synthetic products, such as the furfural, acetylene, urea, or resins of the glyptal type. This disk may, if desired, comprise a substantially pure resin, but preferably it is made up either of a laminated structure in which the laminæ comprise paper, canvas, or other cellular structure, or a moulded resin having felted or loosely knitted cellular or other type of filling material.

As shown, particularly in Figure 2, the disk 13 completely closes off the open face of the drum and may be secured either to the interior or exterior surface of the spider by any suitable form of securing means, (shown for convenience as the rivet members 14).

In mounting the backing plate with respect to the drum, its diameter may be chosen over size, that is to say, the disk may be chosen of such a size that it abuts the drum. Upon rotation of the drum, the abutting surfaces of the disk 13 will be abraded and worn away to provide a relatively closely adjacent surface. In this manner, each disk 13 may be fitted, with ease, to the particular drum with which it is to be associated, and any inaccuracies in the forming of the drum are corrected by the conformity of the disk to its actual curvature. This is in sharp contradistinction to the present type of backing plate which, being of metal, can not be initially installed with a tight fit, but must be implaced with a substantial clearance.

If desired, the resinoid backing member may be thickened at those sections which receive the cam shaft and anchor pin, so as to provide, in effect, an integral bushing. The physical characteristics of the moulded plastic, that is to say, its fine grained structure and smooth surface, renders it particularly useful as a bush or bearing structure.

If desired, also, the tensile characteristics of the backing plate may be considerably modified. Thus, for example, metal disks or metal wires may be permanently embodied in the resin disk, either throughout its surface or in those areas which receive braking thrust, as, for example, in the area contiguous the anchor pin and the cam shaft. In such circumstances, the closure member would, in effect, comprise a metallo-resin backing plate, since the resin and the metal are permanently and integrally associated with each other. If it is desired, also, the resin of the backing plate may be moulded around a spider-like core of the metal, so as to integrally unite the metallic torque-taking parts with the resin closure, to provide a unitary assemblage. The size and design of the spider may, of course, be widely varied, depending upon the particular type of brake employed and the position at which the backing plate is to be moulded.

Also, if desired, the backing plate may be so moulded as to present web or fin-like sections extending in any given direction to provide increased strength and rigidity for the member. This design may be correlated with the insertion of strengthening elements, such as metal wires or disks, so as to provide optimum tensile characteristics for the closure. It will also be appreciated that the provision of a backing plate of a synthetic resin, with its highly desirable dialectic properties, renders it particularly efficacious for use in electrically operated brakes.

It will now be observed that the provision of a resinoid or a metallo-resinoid backing plate presents many advantages. In the first place, the material is readily formable or mouldable, and can be made to conform to any desired shape. Secondly, by reason of its machinability, it may be "run in" to provide a minimum clearance between it and the drum, and thereby enable the securement of a tight or small closure. When employed as a backing plate, this material can be used as at least a portion of the bearing surfaces of rotating parts, such as the cam shaft. By reason of its easy formability, it can be made up as a composite structure with metals so as to provide at once a torque-taking and a closure member. It will be appreciated, of course, that the backing plate may be first made up and secured detachably to a metal member, or may be made up as a fusible form of the resin and then transferred to the infusible form in contact with the metal so as to be moulded directly thereon. If desired, those portions of the backing plate which are to serve as bearing surfaces may have embodied therein lubricating media so as to provide a permanently lubricated bearing, such, for example, as is described in co-pending application, Serial No. 324,361, filed December 7, 1928.

Therefore, while a particular embodiment of the invention has been described, it is to be understood that this is susceptible of a wide range of modification within the scope of the concepts herein involved, and hence the invention is considered not to reside in a particular mounting or association of the backing plate with the drum structure, but broadly in the concept of the provision of a novel type of brake drum closure.

I claim:

1. A moulded non-metallic brake drum closure.

2. A brake structure comprising a brake drum and an associated resinoid backing plate.

3. A brake structure comprising a brake drum and an associated synthetic resin backing plate.

4. A non-metallic brake drum backing plate.

5. A brake apparatus comprising a metallic brake drum and a non-metallic disc positioned at the open face.

6. A brake apparatus comprising a rotatable metallic brake drum and a non-rotatable non-metallic disc closure positioned at the open face of the drum.

7. A brake apparatus comprising a metallic brake drum and a resinoid backing plate positioned at the open face of the drum.

8. A metallo-resin backing plate for a brake drum.

9. A backing plate comprising a resinoid disc having integral metal torque taking sections.

10. A closure structure for a backing plate comprising metallic torque taking members and a resinoid disc secured to the members.

11. A closure structure for a backing plate comprising a metallic spider and a non-metallic disc member detachably secured to the spider and closing the open face of the drum.

12. A moulded non-metallic brake drum backing plate.

13. A backing plate for a brake drum comprising a disc-like member of electric insulating material.

In testimony whereof I affix my signature

RAYMOND J. NORTON.